(12) United States Patent
Clement et al.

(10) Patent No.: US 8,607,049 B1
(45) Date of Patent: Dec. 10, 2013

(54) NETWORK ACCESS DEVICE FOR A CARGO CONTAINER SECURITY NETWORK

(75) Inventors: Russel E. Clement, El Cajon, CA (US); Stephen L. Childress, San Diego, CA (US); Sarah M. Lauff, San Diego, CA (US); Anton Yen, San Diego, CA (US); Joel T. Baumbaugh, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/195,916

(22) Filed: Aug. 2, 2011

(51) Int. Cl.
*H04L 9/32* (2006.01)

(52) U.S. Cl.
USPC .................................... 713/168; 726/30

(58) Field of Classification Search
USPC ....................................... 713/168
See application file for complete search history.

(56) References Cited

U.S. PATENT DOCUMENTS

| | | | |
|---|---|---|---|
| 7,165,116 B2 * | 1/2007 | Grove et al. | 709/245 |
| 7,317,693 B1 * | 1/2008 | Roesch et al. | 370/252 |
| 7,467,205 B1 * | 12/2008 | Dempster et al. | 709/224 |
| 2002/0059622 A1 * | 5/2002 | Grove et al. | 725/91 |
| 2006/0168070 A1 * | 7/2006 | Thompson et al. | 709/206 |
| 2007/0121548 A1 * | 5/2007 | Manis et al. | 370/330 |
| 2007/0124789 A1 * | 5/2007 | Sachson et al. | 725/117 |
| 2007/0189207 A1 * | 8/2007 | Sammour et al. | 370/328 |
| 2008/0244741 A1 | 10/2008 | Gustafson | |
| 2009/0003226 A1 | 1/2009 | Wang | |
| 2009/0036063 A1 * | 2/2009 | Zuniga et al. | 455/73 |
| 2009/0089369 A1 * | 4/2009 | Russ et al. | 709/203 |
| 2009/0122721 A1 * | 5/2009 | Ko et al. | 370/254 |
| 2010/0180006 A1 | 7/2010 | Nourbakhsh | |
| 2011/0090831 A1 * | 4/2011 | Howard | 370/311 |

OTHER PUBLICATIONS

Genevieve Bartlett Understanding Passive and Active Service Discovery; Oct. 2007; ACM; pp. 1-14.*

* cited by examiner

*Primary Examiner* — Mohammad W Reza
*Assistant Examiner* — Monjour Rahim
(74) *Attorney, Agent, or Firm* — Kyle Eppele; Stephen E. Baldwin; Peter A. Lipovsky

(57) ABSTRACT

In one embodiment, a wireless bridge for wireless to TCP/IP based communication is provided. The wireless bridge can be with reduced functional devices (RFDs) in a star topology network acting as a network access device (NAD). Another embodiment can be with fully functional devices (FFDs) in a peer-to-peer topology network also capable of operating as a NAD. The network address device includes a processor with memory; a radio frequency transceiver front end communicating with the processor; an antenna coupled to the front end; and a power source providing power to the processor and front end wherein the processor with memory contains computer instructions for executing IEEE 802.15.4 standard compliant operations; transmitting a network access device announcement (NADA) message representative of the initiation of passive network discovery to multiple end devices; determining whether a receiving/designated end device is network compliant; establishing communication with the compliant designated end device; and forwarding the NADA message to the designated end device.

19 Claims, 5 Drawing Sheets

| Offset 0 x0 | 1 x1 | 2 x2 | 3 x3 | 11 xB | 12 xC | 20 x14 | 21 x15 | 29 x1D | 30 | 30 + n +1 |
|---|---|---|---|---|---|---|---|---|---|---|
| Standard ICD Message Header Byte 0 | Standard ICD Message Header Byte 1, Messa ge Type = NADA messa ge (0xFF) | Bit 0: UTC is valid Bit 1: is 1 if MW list continues in next NADA ICD use. Bits 2,3: reserved, ICD use. Bits 4-7: Time delay for next NADA; Coding: 0: 0.02 s 1: 0.04 s 2: 0.08 s 3: 0.10 s 4: 0.20 s 5: 0.40 s 6: 0.80 s 7: 1.00 s 8-15: reserved Accurate to +/- 0.01s Coding applies to next interval and may change at any time. | Date/tim e UTC 8 bytes per ICD format | Level 1 Facility Device Type (1 byte) DCP Device | UID of Level 1 Facility (8 bytes) | Level 2 Facility Device Type (1 byte) HNAD Device | UID of Level-2 HNAD | Message waiting list count (1 byte) 0 if none | List of UIDs with message waiting. (n bytes) 0 is a valid count. List size limited by payload size (100 bytes). List content may rotate in successive NADA messages for an unlimited count. | NADA message checksum. One byte half-sum of NADA message (sum of the bytes modulo 256) |

FIGURE 5

NETWORK ACCESS DEVICE FOR A CARGO CONTAINER SECURITY NETWORK

FEDERALLY-SPONSORED RESEARCH AND DEVELOPMENT

This invention (NC 101,017) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_t2@navy.mil

BACKGROUND OF THE INVENTION

The present invention relates to a cargo container security network and more particularly to a network access device and method.

In the past, both private industry and government agencies have investigated ways to improve security in the global supply chain in an effort to protect against criminal activity and terrorist attacks. This has included development of improved mechanical and electronic container seal technology, as well the development of sensor networks and inspection agreements/processes to identify and monitor cargo movement at major ports and transit points throughout the world. In anticipation of new U.S. Government policies on enhanced security requirements for all U.S.-bound cargo, various government and industry teams have been investigating ways to adapt existing technologies and processes to provide monitoring of containers and other conveyances from the Point of Stuffing (PoS)—sometimes called Point of Consolidation—to the Point of Deconsolidation (PoDC). The use of Security Device Systems in the global supply chain is one component of an improved national security posture.

Accordingly, there is a need for a network access device (NAD) which adheres to the formal requirements for security devices consistent with the Department of Homeland Security's (DHS's) security needs and operations, while considering the shipping industry's operational needs.

SUMMARY OF THE INVENTION

In one embodiment, a wireless bridge for wireless to TCP/IP based communication is provided. The wireless bridge can be with reduced functional devices (RFDs) in a star topology network acting as a network access device (NAD). Another embodiment can be with fully functional devices (FFDs) in a peer-to-peer topology network also capable of operating as a NAD. The network address device includes a processor with memory; a radio frequency transceiver front end communicating with the processor; an antenna coupled to the front end; and a power source providing power to the processor and front end wherein the processor with memory contains computer instructions for executing IEEE 802.15.4 standard compliant operations; transmitting a network access device announcement (NADA) message representative of the initiation of passive network discovery to multiple end devices; determining whether a receiving/designated end device is network compliant; establishing communication with the compliant designated end device; and forwarding the NADA message to the designated end device.

BRIEF DESCRIPTION OF THE DRAWINGS

The invention will be more fully described in connection with the accompanying drawings, where like reference numerals designate like components, in which:

FIG. 5 shows a table illustrating NAD network discovery tables.

DETAILED DESCRIPTION OF THE PREFERRED EMBODIMENTS

The Advanced Container Security Device (ACSD) Network and Security Protocols described herein provide system and component technical requirements for Department of Homeland Security (DHS) Advanced Container Security Device (ACSD) System. This system is inclusive of the Container Security Device (CSD), Marine Asset Tag Tracking System (MATTS) as well as the Electronic Chain of Custody (ECoC) concepts and technologies. DHS is currently conducting an integrated research, development, test, and evaluation program to develop secure supply chains through the implementation of the ACSD technologies. This effort includes future data and communications architecture, portal inspection systems, advanced trade data collection, advanced targeting systems, cargo tracking and tagging systems, Electronic Chain of Custody Devices (ECoCs), Container Security Devices (CSDs) and Advanced Container Security Devices (ACSDs). The primary emphasis of the program is to assure the physical security of the container/conveyance (and its contents), specifically directed at the detection of unauthorized opening, closing, or removal of the doors, penetration of any of the six sides, and human presence. Of secondary importance are detection of the container/conveyance's location, and the recording of container/conveyance interactions. The security device must survive the rigors of intermodal transport, especially the marine environment.

The present invention is directed to implementation of the ACSD Protocols through a non-secure network access device (NAD). The functional goal of a non-secure network access device (NAD) is to provide a bidirectional wireless RF communication interface to security devices, based upon IEEE Standard 802.15.4-2006 physical and data link layer protocols.

Figure 1:
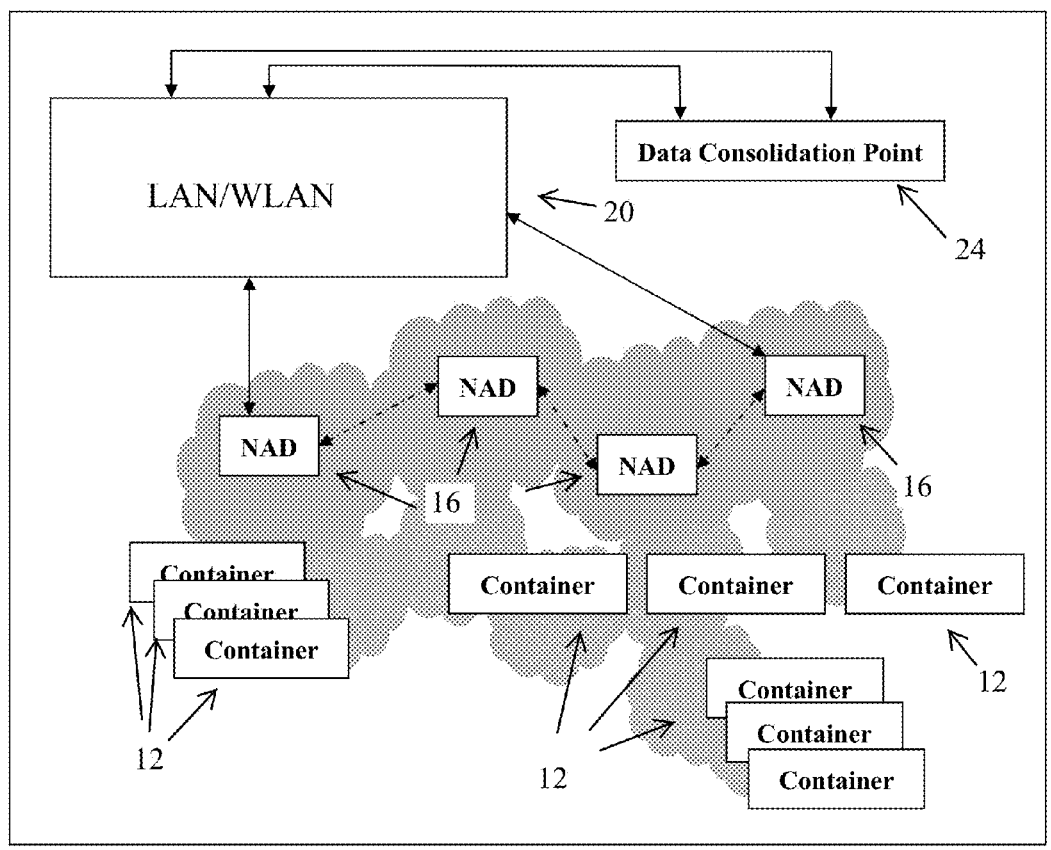
FIG. 1 shows a network topology example of dispersed containers utilizing multiple network access devices (NADs) of the present invention.

FIG. 1 shows a block diagram of a network topology example 10 with multiple dispersed containers (conveyances) 12, either at gate or in storage. Multiple NADs 16 can communicate with any one of the multiple containers 12 such as shown in FIG. 1. The NADs 16 also communicate with terrestrial or satellite LAN/WLANs 20 with connectivity to a DCP (Data Consolidation Point) 24, optionally via a local/regional DCP/gateway. Encrypted secure messages are forwarded verbatim to the host nation's security center, and vice-versa. DCPs 24 may interoperate to collaborate.

The Non-secure Network Access Device (NAD) described herein provides a bidirectional wireless RF communications interface to Security Devices, based upon IEEE Standard 802.15.4-2006 physical and data link layer protocols. The NAD is the link for data and command transmission between Security Devices and the operator or a Data Center (DC). A NAD may be any appropriate mix of hardware, software, and internal interfaces that satisfy the functional requirements and user interface requirements specified for a NAD application.

The NAD implementations supporting Advanced Container Security Device (ACSD)/Container Security Device (CSD)/Electronic Chain of Custody (ECoC) and Marine Asset Device Tracking System (MATTS) Networks range from completely transparent Non-secure NADs to Secure NADs. Non-secure NADs pass messages to and from a DC without modification as part of the un-trusted network. Generally speaking, these are in fixed locations that do not assume the presence of, or access control by, a trusted agent.

NADs implemented as fixed installations (not portable) as part of the un-trusted network are referred to as Fixed NADs (FNADs). FNADs are always mains-powered (i.e., general AC electric power supply). At the other functional extreme are Secure NADs that possess authorizing credentials that allow them to issue restricted commands and access encrypted messages and log files in the same fashion as a Data Center. These devices are intended to always be in the possession and complete control of a trusted agent and as such are most likely to be portable (handheld) NADs (HNADs). HNADs can be either Secure or Non-secure NADs but in all cases are battery powered.

All NADs support the following tasks:

Identify Security Devices in their RF communication range,

Establish a wireless network connection with the Security Devices,

Deliver Security Device Commands to the Security Device,

Acquire Security Device Status Messages and Security Device Event Logs, and

Communicate Security Device Status Messages and Security Device Event Logs to the assigned DCP.

Figure 2:
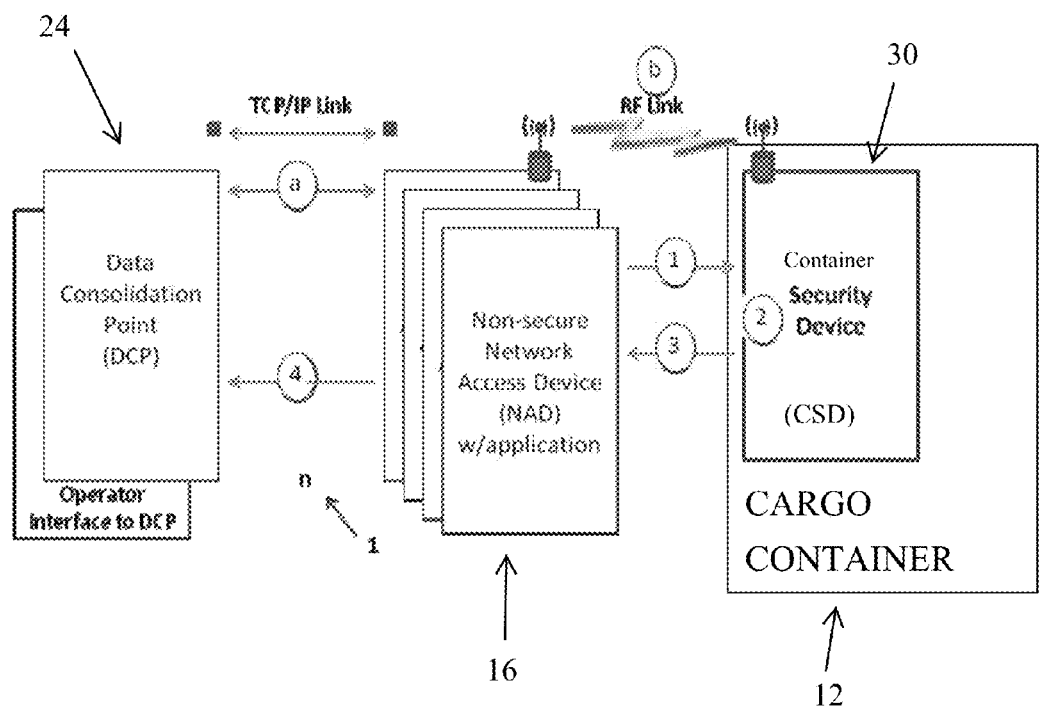
FIG. 2 shows an example of multiple NADs utilized with a container security device.

FIG. 2 shows the communication links between the CSD 30, multiple Non-secure NADs 16 (i.e., NADs 1-$n$), and DCP 24, and more particularly the communications links for status message steps where the security device is a CSD (Container Security Device) 30.

The CSD 30 monitors the integrity of a cargo container 12 from the point-of-consolidation to the point-of deconsolidation, such as in a maritime supply chain. Typically, the CSD 30 is attached to the inside of a cargo container 12 to monitor all six interior sides and report any intrusion or door opening or the presence of human cargo. If the CSD 30 detects an intrusion, breach, door opening, human, or the like, the CSD 30 transmits alarm information via the RF link shown in FIG. 2.

In order for the Non-secure Network Access Device 16 to transmit and receive data, it must first establish connectivity with the Data Consolidation Point 24 via a TCP/IP link while providing wireless coverage of one or more Security Devices 30 via an 802.15.4 RF link. Once these connections are complete, encrypted messages can be sent between the DCP 24 and the Security Device 30. The order of messages sent for all types of Security Device messaging are described below.

During pre-operations, at step a in FIG. 2, the NAD 16 communications with the DCP (Data Consolidation Point) 24 are enabled via the TCP/IP link. At step b, the CSD 30 enters coverage of one or more NADS 16 via the RF link.

For unsolicited status message exchange steps, at step 1 in FIG. 2, the NAD 16 transmits a network access device announcement (NADA) message to the CSD 30 via the RF link. At step 2, the CSD 30 validates the NADA message and selects a NAD 16 from the multiple NADs (i.e. NADs 1-$n$ shown in FIG. 2) for a message exchange based on signal quality. At step 3, the CSD 30 sends the CSD Status Message to the selected NAD 16 via the RF link. At step 4, the selected NAD 16 forwards the CSD Status Message to the DCP 24 via the RF link.

Figure 3:
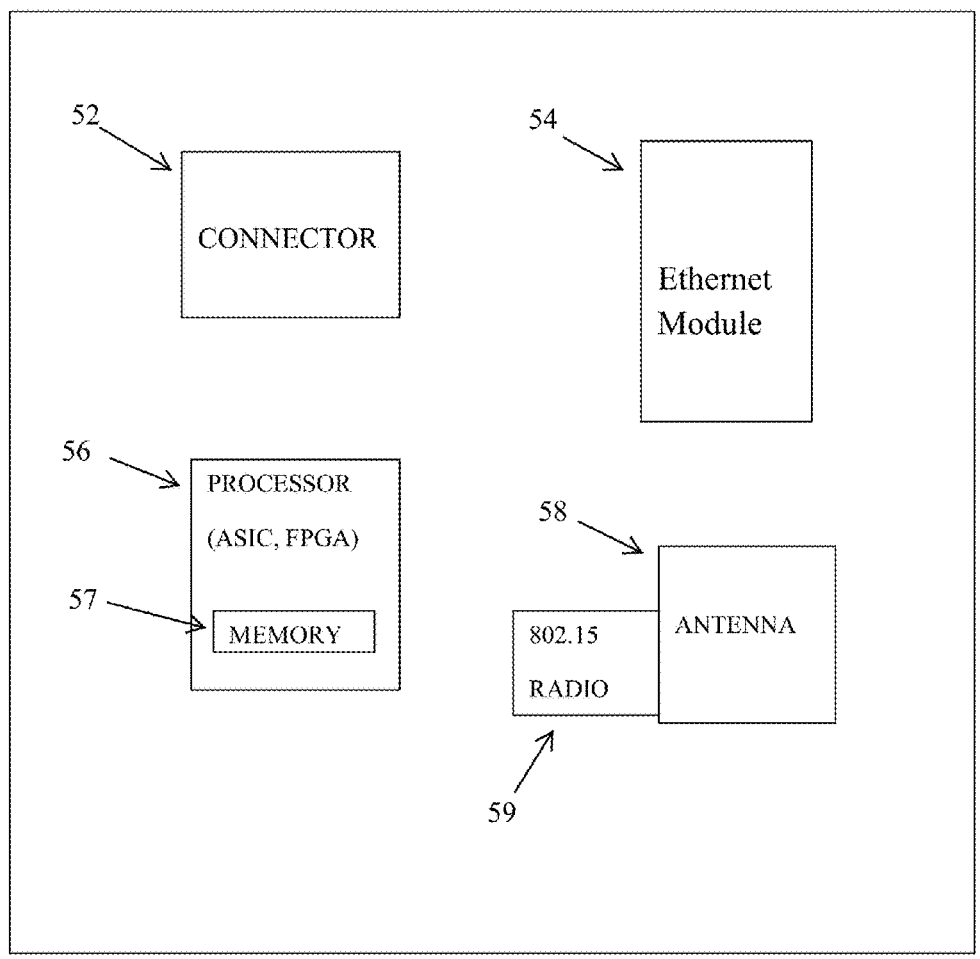
FIG. 3 shows a block diagram of a fixed version of a non-secure network access device (NAD).

FIG. 3 shows a block diagram of one preferred implementation of the non-secure network access device for a fixed installation. This device will be situated a critical locations such as the gateway entrance to a port to establish a wireless connection to Advanced Container Security Devices (ACSDs), Container Security Devices (CSDs) and Electronic Chain of Custody (ECoC) Devices as they come within range and pass the information on to a Data Consolidation Point (DCP).

Suitable components which can be utilized as a NAD 16 shown in FIG. 3 include a connector 52, an Ethernet module 54, a processor 56 (e.g., ASIC, FPGA) with memory 57, and an antenna 58 associated with front end IEEE Standard 802.15 RF radio (transceiver) 59, which communicates with processor 56. The components shown in FIG. 3 can be suitably interconnected to provide the NAD capabilities described herein, as would be apparent.

Figure 4:
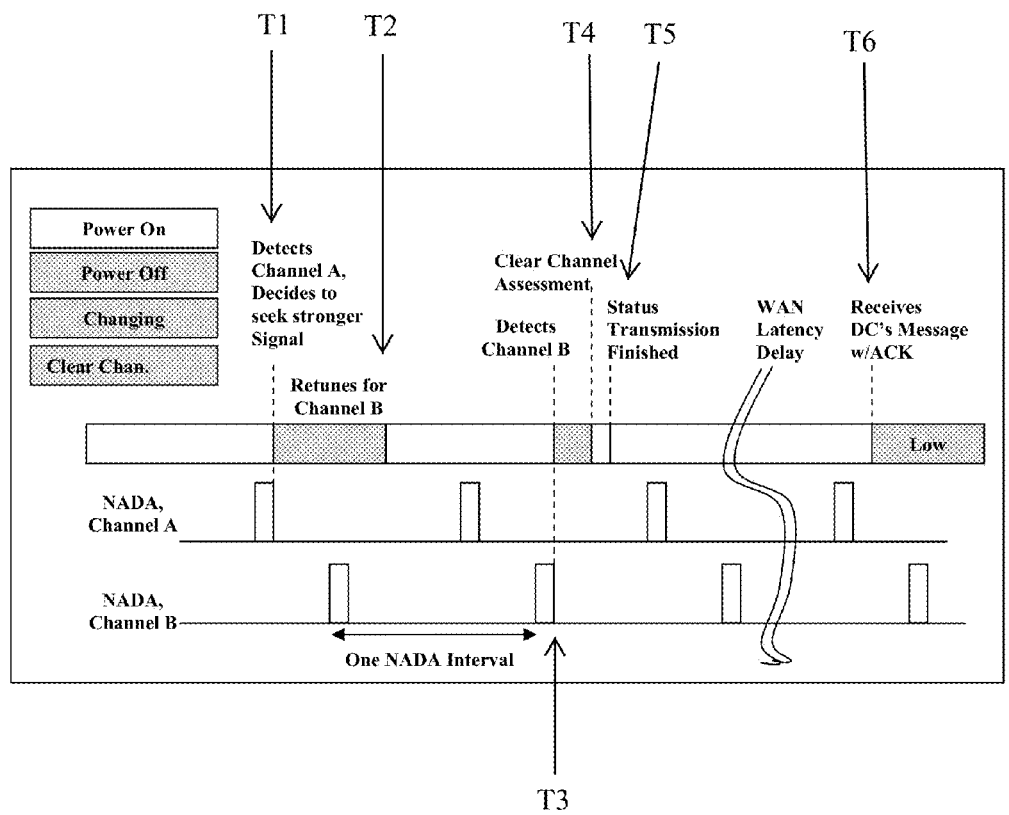
FIG. 4 shows a timing diagram of passive network discovery of multiple NADs.

FIG. 4 shows, for illustrative purposes, an example of passive network discovery and unsolicited status timing, using two NADs. The timing events shown in FIG. 4 are identified as events T1-T6 for purposes of explanation. The timing of one NADA interval is shown for NADA, Channel B in FIG. 4. The same time interval is shown for NADA, Channel A. A WAN Latency Delay is also shown in FIG. 4.

Regarding the time events shown in FIG. 4, at time T1, a detection of Channel A occurs, and a decision is made to seek a stronger signal. At time T2, a retuning for Channel B occurs. At time T3, a detection of Channel B occurs. At time T4, a Clear Channel Assessment is made. At time T5, the Status Transmission Finished occurs. After the WAN Latency Delay, at time T6, a reception of the DC's Message with Acknowledgment occurs.

The Non-secure Network Access Device implements suitable ACSD Network Protocols. The ACSD Network and Security Protocols (discovery, data formats and messaging procedures) provide a network extension to the internet providing full access to vendors who intend to support the DHS concept of cargo security.

The Non-secure NAD described herein implements the IEEE 802.15.4-2006 Standard to define the wireless air interface. Many Standards-compliant commercial off the shelf products exist. The key elements of this interface are the Medium Access Control (MAC) and the Physical Layer (PHY). The Non-secure NAD utilize a specific configuration of the MAC and PHY. This standard MAC/PHY assures basic interoperability among multiple suppliers' devices.

However, key inadequacies of the IEEE 802.15.4 Standard exist as summarized in the list below; solutions to these inadequacies are then subsequently described in detail.

Spontaneous Off-Premises Transmissions:

End devices that are mobile in nature, such as those that would be used on conveyances used in logistics (containers, etc.), are the Standard's mechanism for network discovery (i.e. detecting in-RF-coverage). End devices transmit a particular association request message to a candidate network access node to indicate a desire to join the network. This is known as "active" network discovery in that the device must transmit non-data (management) messages prior to sending user data. This methodology results in inefficient battery consumption and air time usage. When recurring unsolicited messages are transmitted to no avail (e.g. to probes) and not in areas of intended operation, a violation of some countries' spectrum usage regulations may occur.

Poll for Possible Waiting Data:

For mobile battery powered devices, the Standard defines that the device will transmit a poll message to a specific network node that may have queued messages held in queue while the end device was in a temporary power conservation state (not capable of receiving). Poll messages consume power and occupy precious air time in the RF channel.

RF Spectrum Scan for Network Discovery:

End devices scan all available RF channels to perform network discovery. This is inefficient as it increases battery consumption for mobile devices moving among the continents of the word.

Transmission Time Slot Requests:

For time-slot (TDMA) based use of the Standard, end devices must transmit initial and recurring management messages to request and renew time slots for transmissions. For mobile devices in poor RF conditions (such as the locales described in this document), these and other management messages become more numerous than the small user data messages. In poor conditions, the probability of successful delivery of user data messages is thus greatly diminished due to the prerequisite management messages.

Custom Beacon Message Content:

The Standard's beacon message may contain special content to convey that messages are held in queue ("message waiting") for end devices to discover, or other information. Commonly available, unaltered commercially available products do not expect beacon payload content. Placing such data into the beacons requires modification of commercial off the shelf Standards-compliant products' firmware which was base-lined after proof of compliance with the Standard by the product provider. Altering the product (a modem-like device) introduces risk and warranty invalidation.

Network Existence Broadcast Messages without Frame Collisions:

The Standard is such that adjacent access nodes that transmit recurring beacons to advertise coverage existence and the identity of each node must use independent channels to preclude data frame collisions in time. This then requires more scanning by end devices.

Limited Beacon Message Payload Size:

If this is used for sending a list of end devices for which there are message-waiting conditions, the use of the beacon limits the size of such data to less than it would be for a user data frame.

Network Existence Broadcast Messages with System Security:

The Standard lacks a practical means to advertise the existence of access devices along with a reference to which encryption key is required, given layer 3 encryption is used for end-to-end security. This is required for systems as described here for end device to final data center (crossing WANs and LANs), with encryption and decryption only by the end points, and in a connectionless manner.

Network Discovery Recurring Beacon Interval being Invariant.

End devices must be configured for a fixed time interval to assure signal detection congruent with battery conservation time cycles ("sleeping").

The inadequacies described above are now addressed and implemented as described below and have been shown in conjunction with FIGS. 1-5.

Spontaneous Off-Premises Transmissions:

The Non-secure NAD device enables mobile on-conveyance end devices (i.e. Security Devices) to perform passive (no transmissions) network discovery. To do so, each NAD transmits a prescribed message called Network Access Device Advertisement (NADA) message in accordance with the defined configuration of the Standard's MAC and PHY. End devices passively scan a defined subset of the Standard's RF channels to detect NADAs and choose the best quality signal among multiple NADs. In doing so, the end device then sends a single encrypted data frame message destined for the data center that may require retransmissions across LANs and WANs. Thus, management messages, including spontaneous off-premises messages are eliminated in total.

Poll for Possible Waiting Data:

Polling to inquire about waiting messages is eliminated as follows. End devices receive the NADs' NADA messages (as above) at network discovery, and thereafter, according to a battery conservation (wake-up) timing choice. Each NADA contains a list of end device identity codes, for devices that have undelivered messages (message waiting) at the NAD. Multiple NADs may hold the same message, to support end device mobility. The end device passively detects its identity in the list in the NADA. On detecting a message waiting for a given device, that device transmits one request message to the chosen NAD to cause the waiting message content to be transmitted.

RF Spectrum Scan for Network Discovery:

End devices do not scan all available RF channels. A specific subset of channels is defined. The NADA message described above enables passive network discovery with optimal battery conservation.

Transmission Time Slot Requests:

The NADs with NADA message content enable end devices to use the Standard's CSMA/CA for medium access rather than TDMA. Precise message latency management is thus not required, as is the purpose of TDMA time slots. The numerous undesired management messages for time slot acquisition and renewal are thus eliminated.

Custom Beacon Message Content:

The NADA message of the NADs is used instead of the Standard's beacons. The NADA messages are ordinary user data messages. Commonly available commercial products need not expect beacon payload content be present. Therefore, no alteration of the Standards-compliant commercial products' firmware is needed. This eliminates the risks and warranty or life cycle support issues arising from altered commercial products used as an element of a larger device.

Network Existence Broadcast Messages without Frame Collisions:

The Standard's beacon transmissions are not used. Instead, the CSMA/CA coordinated NADA messages are used as described above.

Limited Beacon Message Payload Size:

The Standard's beacon transmissions are not used. Instead, the CSMA/CA coordinated NADA messages are used, with the full size user data payload size potential rather than the limited beacon payload size.

Network Existence Broadcast Messages with System Security:

The Standard addresses only layer 2 encryption with a shared-key mechanism. The NAD devices, and overall end to end system design, enables end to end encrypted messages to be exchanged by the end devices and the destination data center, using layer 3 encryption, independent of all kinds and sorts of transport networks in the LAN/WAN paths. The NAD's NADA message content includes a code to indicate which undisclosed encryption key is required for communicating with the data center affiliated with a given NAD. This enables a key unique to each end device so that compromise of an encryption key does not affect other end devices' security.

Network Discovery Recurring Beacon Interval being Invariant.

Each NADA message contains a definition of the time until the next (future) NADA will be transmitted. End devices use this to select a power conservation cycle time. Thus, the interval may vary from site to site and may vary in time length, according to needs such as optimizing battery power consumption strategies but with interoperability maintained among products and suppliers that use different strategies.

Collectively, the above list of mechanisms implemented in the Non-secure NAD augment the use of the generic IEEE 802.15.4 Standard's MAC and PHY with the means to support interoperability, battery conservation, and the dynamics encountered in the logistics applications with mobile devices.

In one embodiment, a wireless bridge for wireless to TCP/IP based communication with reduced functional devices (RFDs) in a star topology network acts as a network access device (NAD), and with fully functional devices (FFDs) in a peer-to-peer topology network also capable of operating as a NAD. The network access device includes a processor with memory; a radio frequency transceiver front end communicating with the processor; an antenna coupled to the front end; and a power source providing power to the processor and front end. The processor with memory contains computer instructions for executing IEEE 802.15.4 standard compliant operations; transmitting a Network Access Device Announcement (NADA) message representative of initiation of passive network discovery; determining whether a receiving/designated end device is network compliant; establishing communication with the compliant designated end device; and forwarding the NADA to the designated end device.

The network access device that is described herein may be used in conjunction with the networking requirements of the ACSD, CSD, ECOC and MATTS technologies. In addition, future references to the Munitions Security Device and Weapons Tracking Seal technologies are also related. Any network constructs that reference one or more of these efforts are intended to include but not limited to home appliance networks, home security networks, medical and power monitoring networks and consumer electronics networks including toys and gaming. Other types of networks that are not regularly mentioned in literature that may be subject to this disclosure includes dynamic networks used for inventory of stored materials such as classified documents, weapons, munitions, hazardous materials and radioactive materials that need to be monitored for long periods of time.

From the above description of the network access device, it is apparent that various techniques may be used for implementing the concepts of the present invention without departing from its scope. The described embodiments are to be considered in all respects as illustrative and not restrictive. It should also be understood that the network access device is not limited to the particular embodiments described herein, but is capable of many embodiments without departing from the scope of the claims.

What is claimed is:

1. A wireless bridge for wireless to TCP/IP based communication acting as a network access device (NAD), the network address device comprising:
   a processor with memory;
   a radio frequency transceiver front end communicating with the processor;
   an antenna coupled to the front end; and
   a power source providing power to the processor and front end wherein
   the processor with memory containing computer instructions for
   executing IEEE 802.15.4 standard compliant operations;
   transmitting a network access device announcement (NADA) message representative of the initiation of passive network discovery to multiple end devices;
   determining whether a designated end device is network compliant;
   establishing communication with the compliant designated end device;
   and forwarding the NADA message to the designated end device;
   implementing a set of air interface protocols on the wireless side that allow for network discovery and status message exchanges with end devices whose addresses are not pre-programmed into the access device in advance in a connectionless manner;
   supporting network discovery and status message exchange requirements for end devices randomly moving in and out of network access device coverage;
   implementing a set of reduced medium access control (MAC)-layer messaging protocols to minimize RF channel traffic and coexistence with commercial standard 802 systems.

2. The device of claim 1, further comprising a module containing the instructions for IEEE 802.15.4 standard compliant operations, coupled to the processor.

3. The device of claim 1, wherein the front end is multi-frequency.

4. The device of claim 1, wherein the power source is either battery or mains powered.

5. The device of claim 1, wherein the computer instructions further comprise instructions for clear channel assessment.

6. The device of claim 1, wherein the computer instructions further comprise instructions for:
   selectively transmitting on a predetermined set of radio frequency channels for network discovery;
   responding to the data center.

7. The device of claim 1, wherein the computer instructions further comprise instructions for:
   forwarding from an end device to the data center;
   receiving a matching identity code from the end device; and
   forwarding a waiting message from the data center to the end device.

8. The device of claim 1, wherein the computer instructions further comprise instructions for forwarding messages from the data center with different levels of encryption to end devices with matching encryption.

9. The device of claim 1, wherein the computer instructions further comprise instructions for going into a power conservation state based on next-time-of-transmission information from a received NADA message.

10. The device of claim 1, wherein the NAD is in wireless communication with another NAD.

11. The device of claim 1, wherein the NAD is in wireless communication with the data center.

12. The device of claim 11, wherein the data center is hosted in a network cloud.

13. A method for wireless to TCP/IP based communication in a network access device (NAD) where the NAD includes a processor with memory;
   a radio frequency transceiver front end communicating with the processor; an antenna coupled to the front end;
   wherein the processor with memory containing computer instructions for:

executing IEEE 802.15.4 standard compliant operations;

transmitting a network access device announcement (NADA) message representative of the initiation of passive network discovery to multiple end devices;

determining whether a designated end device is network compliant;

establishing communication with the compliant designated end device;

and forwarding the NADA message to the designated end device;

implementing a set of air interface protocols on the wireless side that allow for network discovery and status message exchanges with end devices whose addresses are not pre-programmed into the access device in advance in a connectionless manner;

supporting network discovery and status message exchange requirements for end devices randomly moving in and out of network access device coverage;

implementing a set of reduced medium access control (MAC)-layer messaging protocols to minimize RF channel traffic and coexistence with commercial standard 802 systems.

14. The method of claim 13, wherein communication is multi-frequency.

15. The method of claim 13, further comprising clear channel assessment prior to transmission from a NAD.

16. The method of claim 13, further comprising:
selectively scanning a predetermined set of radio frequency channels for network discovery and sending data to the end device.

17. The method of claim 13, further comprising:
forwarding an end device identity code via the NADA from the DCP to the end device;
receiving a matching end device identity code from the end device; and
forwarding a waiting message from the NAD to the end device.

18. The method of claim 13, further comprising forwarding messages from NADs with different levels of encryption to end devices with matching encryption.

19. The method of claim 13, further comprising putting the end device into a power conservation state based on next-time-of-transmission information from a received NADA message.

* * * * *